United States Patent [19]

Nielsen

[11] Patent Number: 5,805,153
[45] Date of Patent: Sep. 8, 1998

[54] METHOD AND SYSTEM FOR RESIZING THE SUBTITLES OF A VIDEO

[75] Inventor: Jakob Nielsen, Atherton, Calif.

[73] Assignee: Sun Microsystems, Inc., Palo Alto, Calif.

[21] Appl. No.: 565,179

[22] Filed: Nov. 28, 1995

[51] Int. Cl.⁶ .................................................. H04N 5/445
[52] U.S. Cl. ........................ 345/327; 348/553; 348/564; 348/468
[58] Field of Search ................................ 348/7, 467, 468, 348/6, 8, 9, 10, 12, 13, 14, 16, 17, 460, 461, 463, 465, 473, 474, 476, 475, 477, 478, 479, 552, 553, 554, 561, 562, 563, 564, 565–570, 588; 455/3.1, 4.1, 4.2, 5.1, 6.1, 6.2, 6.3; 379/372, 341; 345/327; H04N 5/445, 7/173, 7/16

[56] References Cited

U.S. PATENT DOCUMENTS

| | | | |
|---|---|---|---|
| 5,031,122 | 7/1991 | Witty | 364/525 |
| 5,375,160 | 12/1994 | Guidon et al. | 348/468 X |
| 5,392,223 | 2/1995 | Caci | 348/17 X |
| 5,442,389 | 8/1995 | Blahut et al. | 348/7 |
| 5,497,241 | 3/1996 | Ostrover et al. | 358/341 |
| 5,513,342 | 4/1996 | Leong et al. | 395/157 |
| 5,519,443 | 5/1996 | Salomon et al. | 348/467 |
| 5,537,151 | 7/1996 | Orr et al. | 348/564 |

*Primary Examiner*—Nathan J. Flynn
*Attorney, Agent, or Firm*—McDermott, Will & Emery

[57] ABSTRACT

The preferred embodiment of the present invention provides a method and system for resizing subtitles of a video without resizing the video image itself. The preferred embodiment is typically user initiated. First, a user requests a video from a server. The server transmits two data streams, a video/audio (hereinafter referred to as "video") data stream and a text data stream, over the network to the client computer. The client receives and sends both data streams to a viewer program (e.g., a browser). The browser combines the two data streams into a single window as seen by the user.

Since the video and subtitles are sent as two separate streams of information, upon user request the browser is able to resize the subtitles and the subtitle viewing area independently from resizing the video image. The browser resizes the subtitles by rendering the subtitles in a user selected font size. In this way, the problems associated with the prior art technique of proportional resizing are avoided while the benefits of limited data transmission over the network are maintained.

21 Claims, 6 Drawing Sheets

METHOD AND SYSTEM FOR RESIZING THE SUBTITLES OF A VIDEO

FIELD OF THE INVENTION

The present invention relates to an improved method and system for displaying subtitles of a video.

BACKGROUND OF THE INVENTION

Videos often use subtitles in order to allow people who do not speak the language used in the video to understand the video. A problem arises when these video productions are transmitted over computer networks and displayed on computer terminals, because the subtitles are often too small to read. The subtitles are transmitted in this manner because only a limited amount of video data is sent from the video server to the requesting computer in order to reduce the time it takes to transmit the data over the network. The limited amount of video data received at the requesting computer is designed for display in a small, "postage-stamp" sized window. Unfortunately, the subtitles are practically unreadable in these small windows.

If the user resizes the video window to make the picture larger, then the subtitles are proportionally increased in size, often making the enlarged text blocky and unreadable. The increase in the size of the subtitles is in proportion to the increase in the size of the video because the traditional approach for providing subtitles is to include the subtitles as part of the analogue video signal which incorporates the video data.

Embodiments of the present invention overcome the deficiencies in the prior art by providing a method and system that allows the user to resize video and subtitle texts independently of one another.

SUMMARY OF THE INVENTION

The preferred embodiment of the present invention provides a method and system for resizing subtitles of a video without resizing the video image itself. The preferred embodiment is typically user initiated. First, a user requests a video from a server. The server transmits two data streams, a video/audio (hereinafter referred to as "video") data stream and a text data stream, over the network to the client computer. The client receives and sends both data streams to a viewer program (e.g., a browser). The browser combines the two data streams into a single window as seen by the user.

Since the video and subtitles are sent as two separate streams of information, upon user request the browser is able to resize the subtitles and the subtitle viewing area independently from resizing the video image. The browser resizes the subtitles by rendering the subtitles in a user selected font size. In this way, the problems associated with the prior art technique of proportional resizing are avoided while the benefits of limited data transmission over the network are maintained.

NOTATIONS AND NOMENCLATURE

The detailed descriptions which follow are presented largely in terms of methods and symbolic representations of operations on data bits within a computer. These method descriptions and representations are the means used by those skilled in the data processing arts to most effectively convey the substance of their work to others skilled in the art.

A method is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be bourne in mind, however, that all of these and similar terms are to be associated with the appropriate physical quantities and are merely convenient labels applied to these quantities.

Useful machines for performing the operations of the present invention include general purpose digital computers or similar devices. The general purpose computer may be selectively activated or reconfigured by a computer program stored in the computer. A special purpose computer may also be used to perform the operations of the present invention. In short, use of the methods described and suggested herein is not limited to a particular computer configuration.

DETAILED DESCRIPTION

Overview Of The Preferred Method

The preferred embodiment of the present invention provides a method and system for resizing subtitles of a video without resizing the video image itself. The preferred embodiment is typically user initiated. First, a user requests a video from a server. The server transmits two data streams, a video/audio (hereinafter referred to as "video") data stream and a text data stream, over the network to the client computer. The client receives and sends both data streams to a viewer program (e.g., a browser). The browser combines the two data streams into a single window as seen by the user.

Since the video and subtitles are sent as two separate streams of information, upon user request the browser is able to resize the subtitles and the subtitle viewing area independently from resizing the video image. The browser resizes the subtitles by rendering the subtitles in a different font size. In this way, the problems associated with the prior art technique of proportional resizing are avoided.

Overview Of The Preferred System

Figure 1:
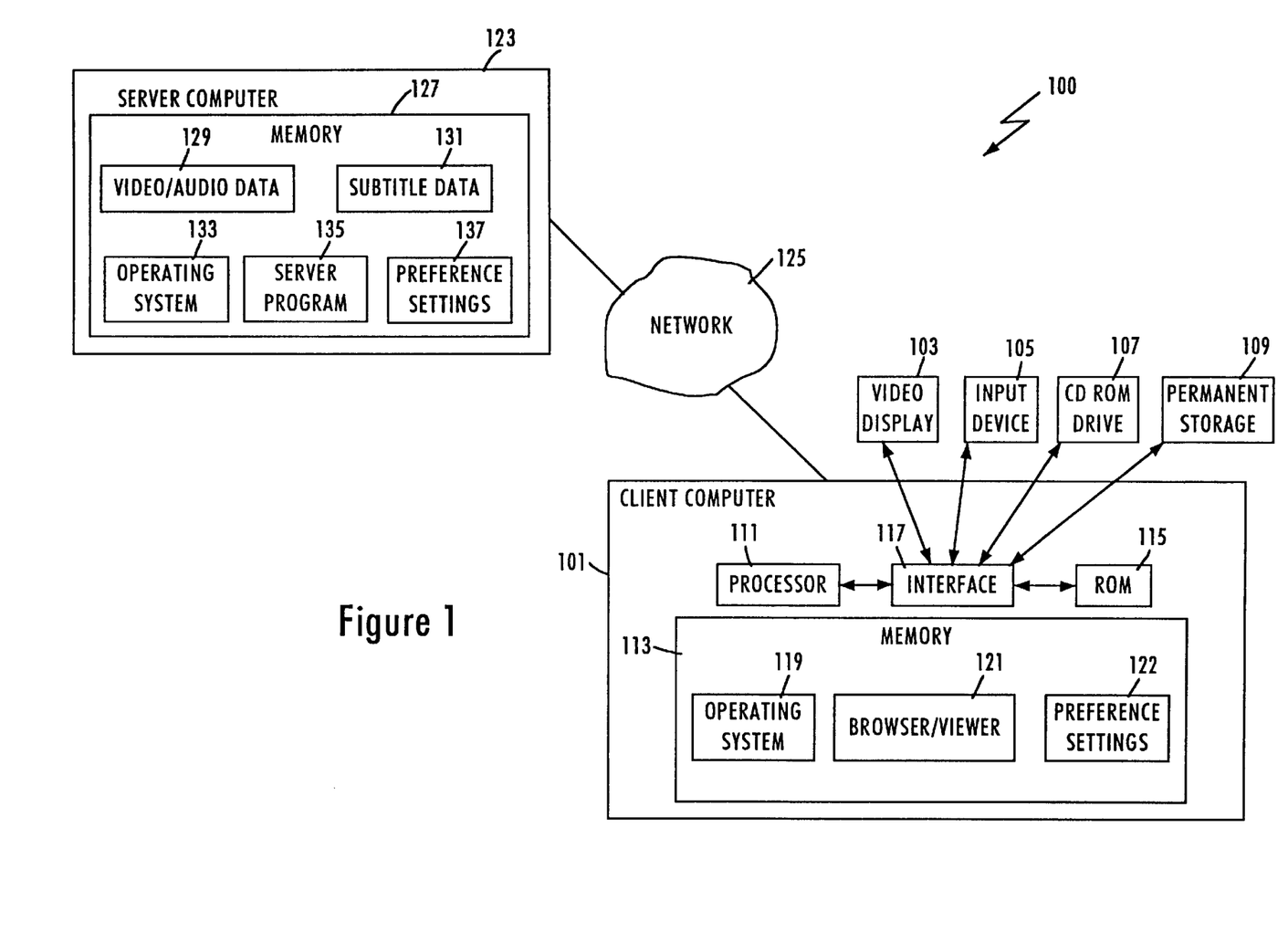
FIG. 1 is a block diagram of a computer system 100 for practicing the preferred embodiment of the present invention.

FIG. 1 is a block diagram of a computer system 100 for practicing the preferred embodiment of the present invention. The computer system 100 includes a client computer 101, a video display device 103, an input device 105, such as a keyboard, mouse, or pointing device, a CD-ROM drive 107, and a permanent storage device 109, such as a disk drive.

The client computer 101 includes a processing unit 111 a random access memory ("RAM") 113, a programmable read-only memory ("PROM") 115, and an interface 117 for enabling communication between the processing unit 111 and the RAM 113 or the PROM 115. The interface 117 also facilitates communication between the processing unit 111 and peripheral devices (e.g., the video display device 103, the input device 105, and the CD-ROM device 107).

The computer memory 113 holds a number of items, including an operating system 119 that is responsible for controlling the allocation and usage of the system's hardware resources, such as memory 113, processing unit 111, and CD-ROM drive 107. The preferred operating system is the Solaris operating system from Sun Microsystems, Inc., of Mountain View, Calif. The computer memory 113 preferably includes a browser program, such as the Hot Java browser from Sun Microsystems, Inc., for facilitating communication over computer networks. Computer memory 113 also includes a preference settings data structure 122 which stores the user's preferred settings for selected attributes. For example, the preference settings data structure 122 may include preferred settings for the language in which to view the subtitles, font size and font type of the subtitles, the size of subtitle viewing area, and the size of video viewing area, as well as the foreground color and background color of the viewing areas.

The client computer 101 is connected to a server computer 123 via a network 125 (such as the World Wide Web). The server computer stores the video, audio, and textual data that the client computer is interested in viewing. The server computer includes a memory 127 which holds video/audio data 129 and text data 131. Any well known technique in the art can be used to digitize the video and audio data. For example, the preferred video standard to use is MPEG-2. The subtitles for a given language are encoded in any appropriate character encoding standard that supports that language. ASCII is the recommended encoding for subtitles in the English language. For subtitles in other western european languages ISO 8859-1 is recommended. For other languages Unicode is recommended. Subtitle data preferably includes:

a) a list of the supported languages for the requested video, and b) for each language: a list of the subtitle strings (some of which can be the empty string) annotated with the frame number in the video where the string should be displayed. The server's memory 127 also includes an operating system 133, a server program 135, and a preference settings data structure 137. The preferred operating system 133 is the Solaris™ operating system from Sun Microsystems, Inc. As is discussed in more detail below, the server program 135 provides the program code for processing user requests to retrieve selected data files. The server program can use any established protocol for file requests and transmission, with the preferred embodiment being the HTTP standard (HyperText Transfer Protocol) that is well-known in the art and supported, for example, by the Netscape Commerce Server product form Netscape Communications Corporation in Mountain View, Calif. The preference settings data structure 137 is similar in nature to the client-side preference settings data structure 122. A difference between the data structures resides in the type of attribute information maintained. The preference settings data structure 137 stores information on those attributes needed to process requests from the client computer 101. For example, the preference settings data structure 137 may include a prioritized list of languages in which the client would like to view subtitles but typically would not include data on the client's preferred font size, since the processing to display the subtitles is typically performed on the client computer 101.

Detailed Description Of An Exemplary Embodiment

Figure 2:
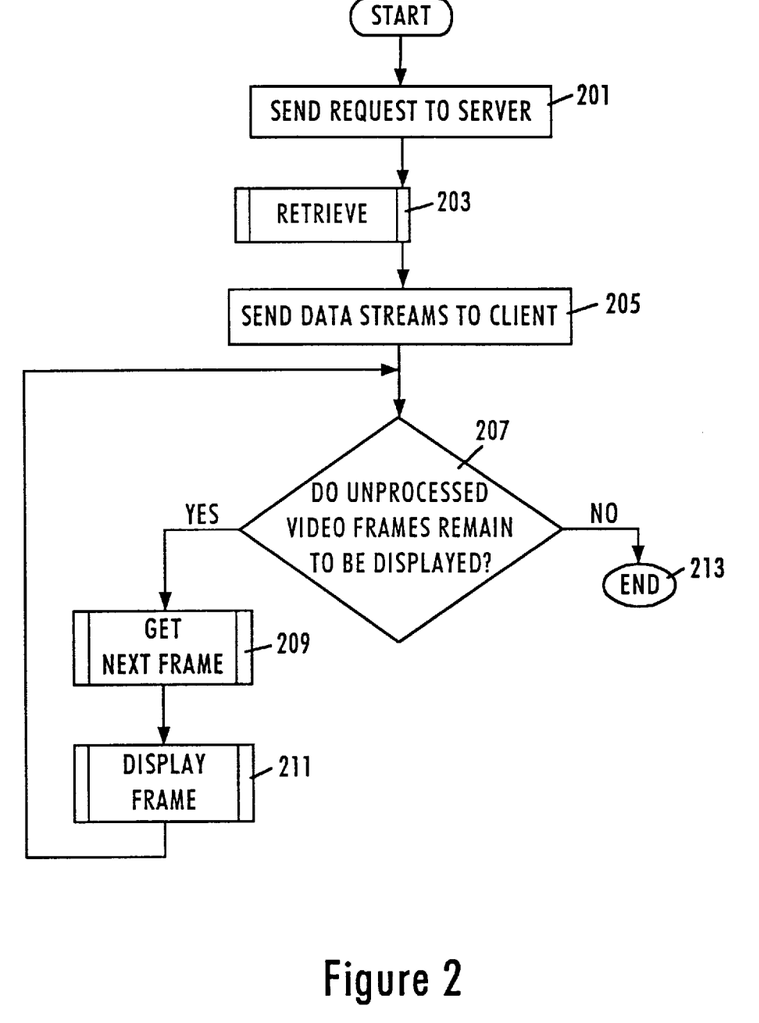
FIG. 2 is a diagram illustrating a high level process flow for a preferred embodiment of the present invention.

The preferred embodiment of the present invention is perhaps best described by way of example. FIG. 2 is a diagram illustrating a high level process flow for a preferred embodiment of the present invention. A user on the client computer 101 sends a request to the server 123 to download a selected video and its accompanying subtitles (step 201). The request preferably includes a list of the user's preferred languages in order of choice. The language preferences may be retrieved by the client computer 101 from a local preference settings data structure.

In response to the request, the server 123 retrieves two separate data streams, the requested video data and its accompanying subtitle data (step 203).

Next, the server 123 sends both streams of data to the client computer 101, along with a list of the languages in which the subtitles can be displayed in (step 205).

The client computer receives both streams of data and sends them to the browser 121. The browser displays the supported language list to the user, preferably through the use of a pull-down menu. If the user requests that subtitles be displayed in a different language, then the client sends the new language request to the server and the server starts sending subtitles in the newly requested language.

If the browser 121 determines that unprocessed video frames remain to be displayed (step 207) then the browser combines the two streams of data (step 209) and displays the video data and the subtitle data on the display device 103 (step 211). Upon completion of step 211 processing continues with step 207. If the browser determines that video frames remain to be displayed then processing proceeds as discussed above. If no video frames remain, however, processing ends in step 213.

Figure 3:
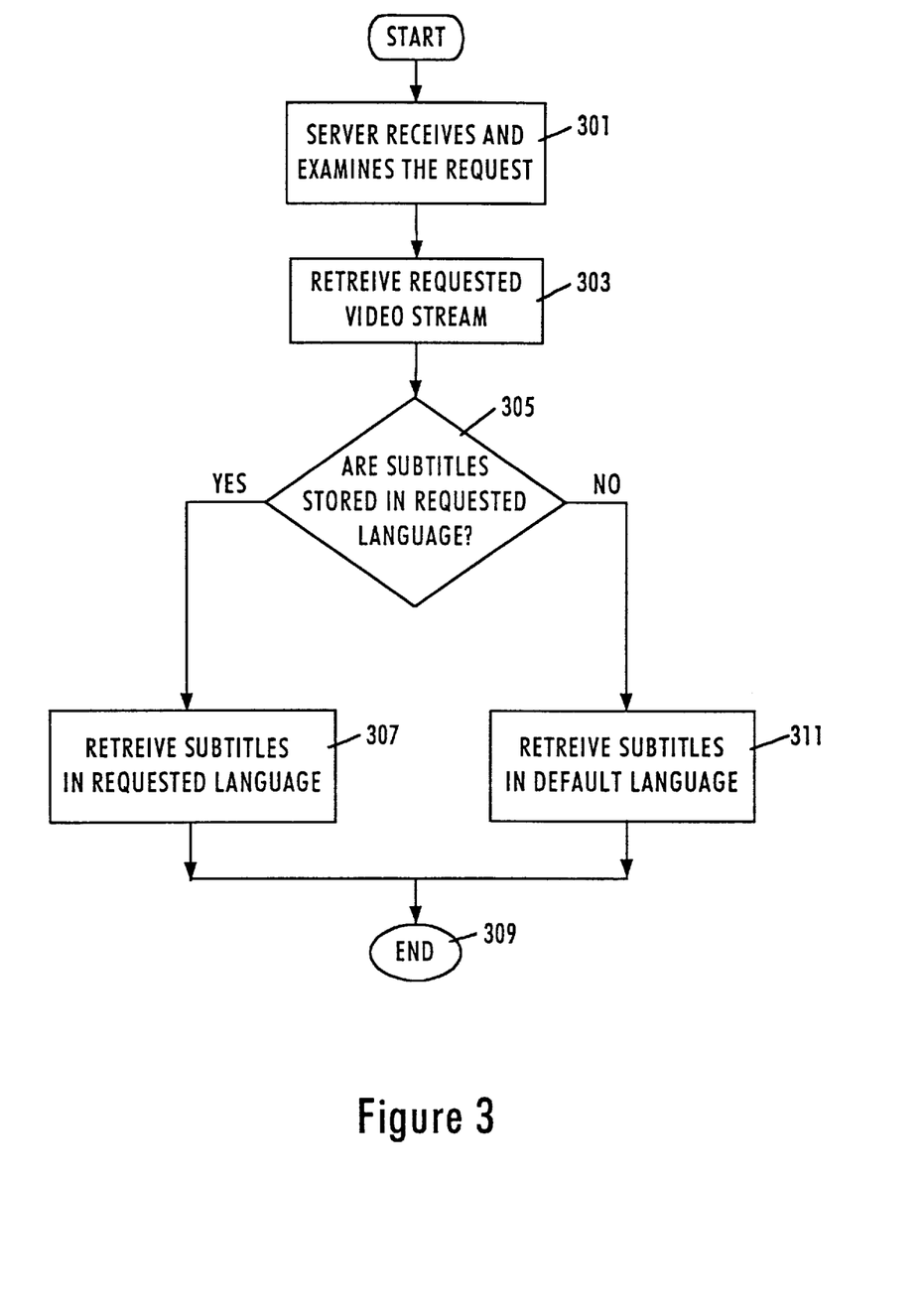
FIG. 3 is a flow diagram illustrating the preferred steps for retrieving from the server a video data stream and a subtitle data stream.

Now that the high level process flow of the preferred embodiment has been described, a more detailed description of certain aspects of the preferred embodiment will provide greater understanding of the present invention. FIG. 3 is a flow diagram illustrating the preferred steps for retrieving from the server a video data stream and a subtitle data stream. In step 301 the server 123 receives and examines the request from the client 101. The server then retrieves the requested video data (step 303). If the subtitles are stored in the language requested by the client (step 305) then the subtitle data, in the requested language, is retrieved (step 307). However, if the subtitles are not stored in the requested language (step 305) then in the subtitle data is retrieved in a default language such as English (step 311). Once the subtitle data is retrieved, processing ends in step 309.

Figure 4:
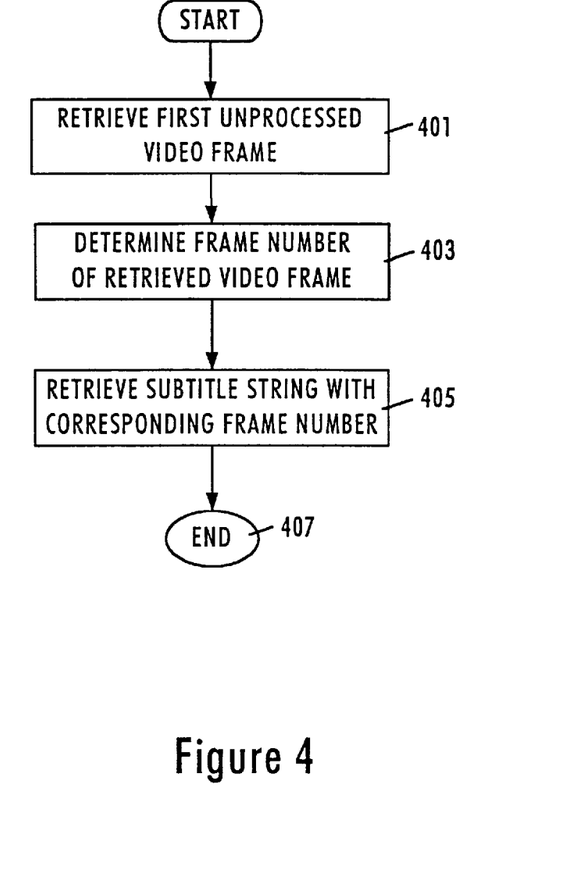
FIG. 4 is a flow diagram of the preferred steps for facilitating a process whereby the video data and the subtitle data are combined for display.

FIG. 4 is a flow diagram of the preferred steps for facilitating a process whereby the video data and the subtitle data are combined for display. First, the browser 121 retrieves the first unprocessed video frame (step 401). Then the browser determines the frame number of the retrieved frame (step 403). Finally, the browser retrieves the subtitle data string with a frame number corresponding to the retrieved frame number (step 405) and then ends processing (step 407). In the preferred embodiment, an applet written in the Java™ programming language is used to perform the processing steps illustrated in FIG. 4.

Figure 5:
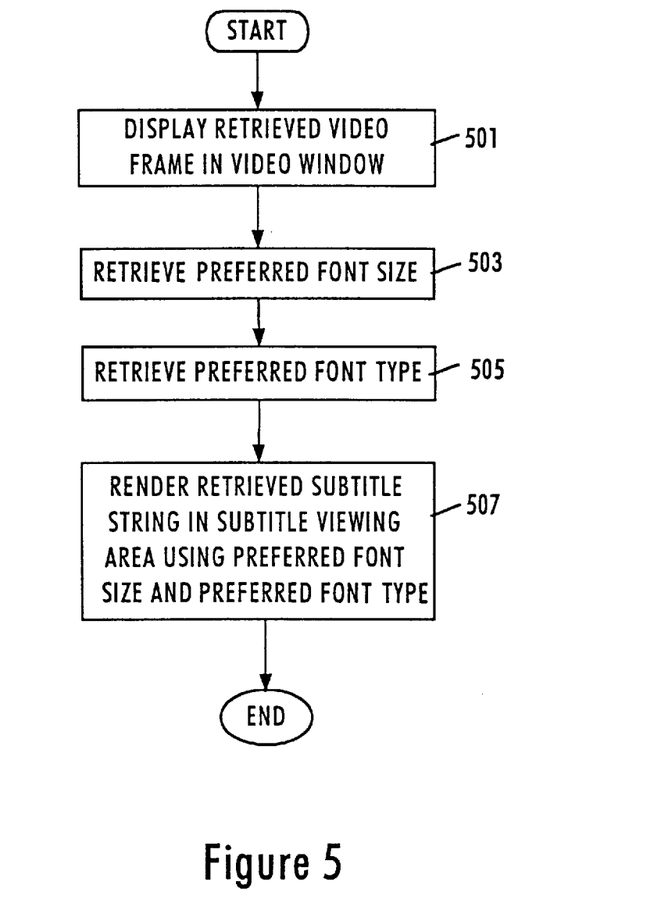
FIG. 5 is a flow diagram of the preferred steps for displaying the video data and the subtitle data.

FIG. 5 is a flow diagram of the preferred steps for displaying the video data and the subtitle data. The browser 121 displays the retrieved video frame in a video window (not shown) (step 501). Next, the browser performs steps for displaying the subtitle data in a user preferred font size and font type. First, the browser retrieves a user specified font size and font type, preferably from the preference settings data structure 122 stored in the client memory 113 (steps 503 and 505). The browser renders the retrieved subtitle string in a subtitle viewing area (not shown but preferably a "letter-box" area under the video with a black background and white letters) using the preferred font size and the preferred font type. The default font size for small viewing windows is 12 point univers black oblique. For large images the preferred default is 24 point univers black oblique.

The default size of the subtitle viewing area makes the viewing area high enough to display enough lines of characters to cover most subtitles for the chosen language. The default size of the subtitle viewing window is preferably the chosen width of the video viewing window and a height equal to two times the chosen font size plus half the chosen font size rounded up to the nearest whole number that is divisible by three. For example, if 12 point univers black oblique is chosen as the font, then the height of the subtitle viewing area is 2*12+0.5*12=24+6=30 points. This height allows for the display of two lines of text with a small amount of leading between the lines and some space above and below the text. The extra space allocated by adding half the chosen font size rounded up to the nearest whole number that is divisible by three is divided equally into three parts that are used for leading between the lines and space above and below the text. In the example above, the leading between the lines and space above and below the text will be 2 points.

Since the subtitles are preferably displayed in a viewing window separate from the video viewing window, the present embodiment of the invention allows the user to resize the subtitle viewing window to make it different in size from the default size, without changing the size of the video viewing window. The window resizing can be performed using any well known technique in the art. For example, if the user "grabs" a corner of the subtitle viewing window and "drags" the window edges to new locations on the screen, then the client computer 101 will redraw the subtitle viewing window according to the new coordinates of the window edges. In a preferred embodiment, the client computer 101 automatically changes the font size to most appropriately accommodate the new size of the subtitle viewing window.

As will be discussed in more detail below, the user of the client 101 is given the ability to reset the font size and font type settings in the preference settings data structure 122. By separating the subtitle data stream from the video data stream and then giving the user the ability to reset the font size of the subtitle string, the present invention allows the subtitle data to be resized independently from the video data. In this way the viewability problem of the prior art is overcome while the benefits from limited data transmission over the network are maintained. In the preferred embodiment, an applet written in the Java programming language is used to perform the processing steps illustrated in FIG. 5.

Figure 6:
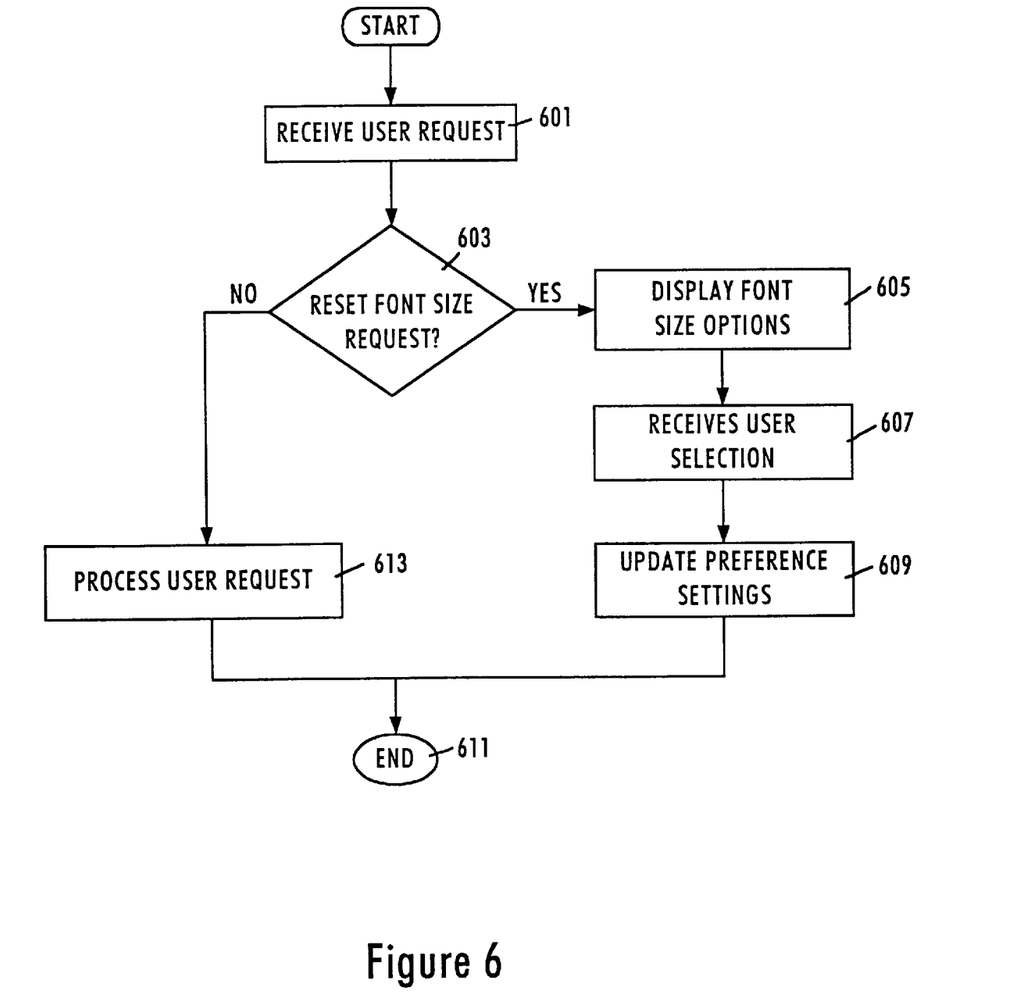
FIG. 6 is a flow diagram of the preferred steps for resetting a font size used to render the subtitle string.

FIG. 6 is a flow diagram of the preferred steps for resetting a font size used to render the subtitle string. In step 601 the browser 121 receives a user request to reset at least one of the attributes in the preference settings data structure 122. This request is typically indicated by actuating a predetermined button on a mouse or actuating a predefined keystroke sequence on a keyboard. The browser examines the user input and determines the appropriate action to take. If the request is to reset the font size (step 603) then the browser displays a list of font size options, preferably in a pull-down menu (step 605). The browser receives a user selection on the pull-down menu (step 607) and, in response, updates the font size setting in the preference settings data structure 122 (step 609). In a preferred embodiment the user can set the font size to zero, which has the effect of removing the subtitles from the display. Upon return from step 609, processing ends in step 611.

Returning to the discussion of step 603, if the browser determines that the user input is not to reset the font size then the browser processes the user request using standard techniques (step 611) and then ends processing (step 611).

While specific embodiments have been described herein for purposes of illustration, various modifications may be made without departing from the spirit and scope of the invention. Accordingly, the invention is defined by the appended claims together with their full scope of equivalents, and is not limited to the above described embodiments.

What is claimed is:

1. A method, executable in a computer system, for displaying subtitle data associated with a video, the computer system including a client computer and a server computer, the server computer storing at least one set of video data and at least one set of subtitle data associated with the video data, the method comprising the steps of:

selecting a video to be displayed on the client computer;

sending a request, from the client computer to the server computer, requesting the server to download the selected video and its associated subtitle data;

receiving the request at the server computer;

in response to receiving the request, retrieving the requested video data and retrieving subtitle data associated with the video data;

sending the retrieved video data at reduced resolution and the retrieved subtitle data from the server computer to the client computer as two separate streams of data;

receiving the two streams of data at the client computer;

displaying the received video data in a first area;

retrieving information stored on the client computer on a preferred font size in which to render the subtitle data to at least partially compensated for the reduced resolution; and displaying the subtitle data in the preferred font size in a second area, whereby the subtitle data in said second area is resized separately from the video data displayed in the first area.

2. The method of claim 1 wherein the request includes a list of languages in which to display the subtitle data, wherein the list is ordered from a most preferred language in which to display the subtitle data to a least preferred language in which to display the subtitle data.

3. The method of claim 2 further comprising the steps of:

determining whether the subtitle data for the requested video is stored in one of the languages on the list;

when the determination indicates that the subtitle data for the requested video is available in one of the languages on the list, retrieving the subtitle data in the most preferred available language; and when the determination indicates that the subtitle data for the requested video is not available in one of the languages on the list, then retrieving the subtitle data in a default language.

4. The method of claim 1 wherein the step of sending the retrieved subtitle data includes the step of encoding the subtitle data in one of an ASCII encoding and a unicode encoding.

5. The method of claim 1 in which the video data is organized into a plurality of frames with each frame of video having an associated frame number and in which the subtitle data is organized into a plurality of subtitle strings with each subtitle string having an associated frame number corresponding to the frame of video with which the subtitle string is displayed, and wherein the step of displaying the subtitle data further includes the steps of:

retrieving the frame number associated with the next frame of video to be displayed; and retrieving the subtitle string whose frame number corresponds to the retrieved frame number associated with the next frame of video to be displayed.

6. The method of claim 1 wherein the step of displaying the subtitle data further includes the steps of:

retrieving a preferred font size in which to display the subtitle data; and using the retrieved font size to render the subtitle data in a subtitle data area independently from a video data area located on the display screen.

7. The method of claim 1 further comprising the steps of:

receiving a request to change the preferred font size to a new font size;

changing the preferred font size to the new font size; and displaying the subtitle data in the new font size, whereby the size of the displayed video data remains unchanged.

8. A computer system for displaying subtitle data associated with a video, the computer system including a client computer and a server computer, the server computer storing at least one set of video data and at least one set of subtitle data associated with the video data, the system comprising:

a module configured to select a video to be displayed on the client computer;

a module configured to send a request, from the client computer to the server computer, requesting the server to download the selected video and its associated subtitle data;

a module configured to receive the request at the server computer;

a module configured to retrieve the requested video data and retrieving subtitle data associated with the video data, in response to receiving the request;

a module configured to send the retrieved video data at reduced resolution and the retrieved subtitle data from the server computer to the client computer as two separate streams of data;

a module configured to receive the two streams of data at the client computer;

a module configured to display the received video data in a first area;

a module configured to retrieve information stored on the client computer on a preferred font size in which to render the subtitle data to at least partially compensate for the reduced resolution; and a module configured to display the subtitle data in the preferred font size in a second area, whereby the subtitle data in said second area is resized separately from the video data displayed in the first area.

9. The system of claim 8 wherein the request includes a list of languages in which to display the subtitle data, wherein the list is ordered from a most preferred language in which to display the subtitle data to a least preferred language in which to display the subtitle data.

10. The system of claim 9 further comprising:

a module configured to determine whether the subtitle data for the requested video is stored in one of the languages on the list;

a module configured to retrieve the subtitle data in the most preferred available language, actuated when the determination indicates that the subtitle data for the requested video is available in one of the languages on the list; and a module configured to retrieve the subtitle data in a default language, actuated when the determination indicates that the subtitle data for the requested video is not available in one of the languages on the list.

11. The system of claim 8 wherein the module configured to send the retrieved subtitle data includes a module configured to encode the subtitle data in one of an ASCII encoding and a unicode encoding.

12. The system of claim 8 in which the video data is organized into a plurality of frames with each frame of video having an associated frame number and in which the subtitle data is organized into a plurality of subtitle strings with each subtitle string having an associated frame number corresponding to the frame of video with which the subtitle string is displayed, and wherein the module configured to display the subtitle data further includes modules configured to:

retrieve the frame number associated with the next frame of video to be displayed; and retrieve the subtitle string whose frame number corresponds to the retrieved frame number associated with the next frame of video to be displayed.

13. The system of claim 8 wherein the module configured to display the subtitle data further includes modules configured to:

retrieve a preferred font size in which to display the subtitle data; and render the subtitle data in the retrieved font size.

14. The system of claim 8 further comprising modules configured to:

receive a request to change the preferred font size to a new font size;

change the preferred font size to the new font size; and display the subtitle data in the new font size, whereby the size of the displayed video data remains unchanged.

15. A computer program for displaying subtitle data associated with a video, the program comprising:

code that selects a video to be displayed on a client computer;

code that sends a request, from the client computer to a server computer, requesting the server to download the selected video and its associated subtitle data;

code the receives the request at the server computer;

code that retrieves the requested video data and retrieving subtitle data associated with the video data, in response to receiving the request;

code that sends the retrieved video data at reduced resolution and the retrieved subtitle data from the server computer to the client computer as two separate streams of data;

code that receives the two streams of data at the client computer;

code that displays the received video data in a first area;

code that retrieves information from the client computer on a preferred font size in which to render the subtitle data to at least partially compensate for the reduced resolution; and code that displays the subtitle data in the preferred font size in a second area, whereby the subtitle data in said second area is resized separately from the video data displayed in the first area, wherein the code resides on a tangible medium.

16. The program of claim 15 wherein the request includes a list of languages in which to display the subtitle data, wherein the list is ordered from a most preferred language in which to display the subtitle data to a least preferred language in which to display the subtitle data.

17. The program of claim 16 further comprising:

code that determines whether the subtitle data for the requested video is stored in one of the languages on the list;

code that retrieves the subtitle data in the most preferred available language, actuated when the determination indicates that the subtitle data for the requested video is available in one of the languages on the list; and code that retrieves the subtitle data in a default language, actuated when the determination indicates that the subtitle data for the requested video is not available in one of the languages on the list, wherein the code resides on a tangible medium.

18. The program of claim 15 wherein the code that sends the retrieved subtitle data includes code that encodes the subtitle data in one of an ASCII encoding and a unicode encoding.

19. The program of claim 15 in which the video data is organized into a plurality of frames with each frame of video having an associated frame number and in which the subtitle data is organized into a plurality of subtitle strings with each subtitle string having an associated frame number corresponding to the frame of video with which the subtitle string is displayed, and wherein the code that displays the subtitle data further includes code that:

retrieves the frame number associated with the next frame of video to be displayed; and retrieves the subtitle string whose frame number corresponds to the retrieved frame number associated with the next frame of video to be displayed.

20. The program of claim 15 wherein the code that displays the subtitle data further includes code that:

retrieves a preferred font size in which to display the subtitle data; and renders the subtitle data in the retrieved font size.

21. The program of claim 15 further comprising code that:

receives a request to change the preferred font size to a new font size;

changes the preferred font size to the new font size; and displays the subtitle data in the new font size, whereby the size of the displayed video data remains unchanged.

* * * * *

UNITED STATES PATENT AND TRADEMARK OFFICE
CERTIFICATE OF CORRECTION

PATENT NO. : 5,805,153
DATED : September 8, 1998
INVENTOR(S) : Jakob NIELSEN

It is certified that error appears in the above-indentified patent and that said Letters Patent is hereby corrected as shown below:

In Claim 15, line 8, "the" should read --that--.

Signed and Sealed this

Twenty-ninth Day of June, 1999

Attest:

Q. TODD DICKINSON

*Attesting Officer*  *Acting Commissioner of Patents and Trademarks*